United States Patent
Osuga

(10) Patent No.: US 11,184,803 B2
(45) Date of Patent: Nov. 23, 2021

(54) DATA TRANSMISSION DEVICE, METHOD AND RECORDING MEDIUM

(71) Applicant: NEC Corporation, Tokyo (JP)

(72) Inventor: Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/619,215

(22) PCT Filed: Jun. 20, 2018

(86) PCT No.: PCT/JP2018/023375
§ 371 (c)(1),
(2) Date: Dec. 4, 2019

(87) PCT Pub. No.: WO2019/004013
PCT Pub. Date: Jan. 3, 2019

(65) Prior Publication Data
US 2020/0187054 A1 Jun. 11, 2020

(30) Foreign Application Priority Data
Jun. 26, 2017 (JP) .............................. JP2017-124336

(51) Int. Cl.
*H04W 28/10* (2009.01)
*H04W 28/02* (2009.01)

(52) U.S. Cl.
CPC ....... *H04W 28/10* (2013.01); *H04W 28/0273* (2013.01)

(58) Field of Classification Search
CPC ..... H04W 28/10; H04W 28/12; H04W 28/16; H04W 28/18; H04W 28/20; H04W 28/22;
(Continued)

(56) References Cited

U.S. PATENT DOCUMENTS

| 2006/0114830 A1* | 6/2006 | Shimonishi | ........... H04L 69/163 370/241 |
| 2010/0034089 A1* | 2/2010 | Kovvali | .................. H04L 67/28 370/235 |

(Continued)

FOREIGN PATENT DOCUMENTS

| JP | 2016-036083 A | 3/2016 |
| JP | 2017-073636 A | 4/2017 |

(Continued)

OTHER PUBLICATIONS

Sangtae Ha, et al., "Cubic: A New TCP-Friendly High-Speed TCP Variant", Proceedings of the ACM SIGOPS, Jul. 2008, pp. 64 to 74, vol. 42, No. 5.

(Continued)

*Primary Examiner* — Kevin D Mew
(74) *Attorney, Agent, or Firm* — Sughrue Mion, PLLC

(57) ABSTRACT

In order to enable to control a transmission data amount within an appropriate range by an easier method, and achieve throughput improvement, shortening of delay, and suppression of packet retransmission in all communication resources, a data transmission method includes: estimating a congestion degree of at least a part of communication sessions in which a communication resource to be used in an own session to be used in transmission of transmission data is shared, based on communication quality being measurable a data transmission device and relating to the transmission of the transmission data, determining a transmission data amount, based on the congestion degree of the communication session, and performing the transmission of the transmission data, based on the transmission data amount.

6 Claims, 8 Drawing Sheets

(58) Field of Classification Search
CPC . H04W 28/26; H04W 28/02; H04W 28/0231; H04W 28/0236; H04W 28/0242; H04W 28/0273; H04W 28/0284; H04W 28/0289
See application file for complete search history.

(56) References Cited

U.S. PATENT DOCUMENTS

| | | | |
|---|---|---|---|
| 2011/0249553 A1 | 10/2011 | Wang et al. | |
| 2013/0021933 A1* | 1/2013 | Kovvali | H04W 88/18 370/252 |
| 2014/0098668 A1* | 4/2014 | Kakadia | H04W 28/0273 370/235 |
| 2014/0119182 A1* | 5/2014 | Kakadia | H04L 47/27 370/235 |
| 2014/0185452 A1* | 7/2014 | Kakadia | H04L 47/30 370/236 |
| 2014/0198643 A1* | 7/2014 | Conway | H04W 28/0278 370/230 |
| 2014/0286258 A1* | 9/2014 | Chowdhury | H04L 47/40 370/329 |
| 2017/0332391 A1* | 11/2017 | Takahashi | H04W 28/12 |
| 2017/0339711 A1* | 11/2017 | Belghoul | H04W 72/0446 |
| 2018/0048581 A1* | 2/2018 | Suga | H04L 47/27 |
| 2018/0070263 A1* | 3/2018 | Falconetti | H04L 47/28 |
| 2019/0319858 A1* | 10/2019 | Das | H04L 43/08 |

FOREIGN PATENT DOCUMENTS

| | | |
|---|---|---|
| WO | 2015/124187 A1 | 8/2015 |
| WO | 2014/098096 A1 | 6/2016 |

OTHER PUBLICATIONS

S. Floyd, et al., "The NewReno Modification to TCP's Fast Recovery Algorithm", Network Working Group Request for Comments: 2582, Category: Experimental, , (RFC 2582)Apr. 1999, pp. 1-12.
Hari Balakrishuan, et al., "TCP Behavior of a Busy Internet Server: Analysis and Improvements", Proceedings of IEEE Infocom 1998, Mar. 1998, pp. 252-262, vol. 1.
International Search Report for PCT/JP2018/023375 dated Aug. 21, 2018 [PCT/ISA/210].
Written Opinion for PCT/JP2018/023375 dated Aug. 21, 2018 [PCT/ISA/237].
Japanese Office Action for JP Application No. 2019-526828 dated Jan. 26, 2021 with English Translation.

* cited by examiner

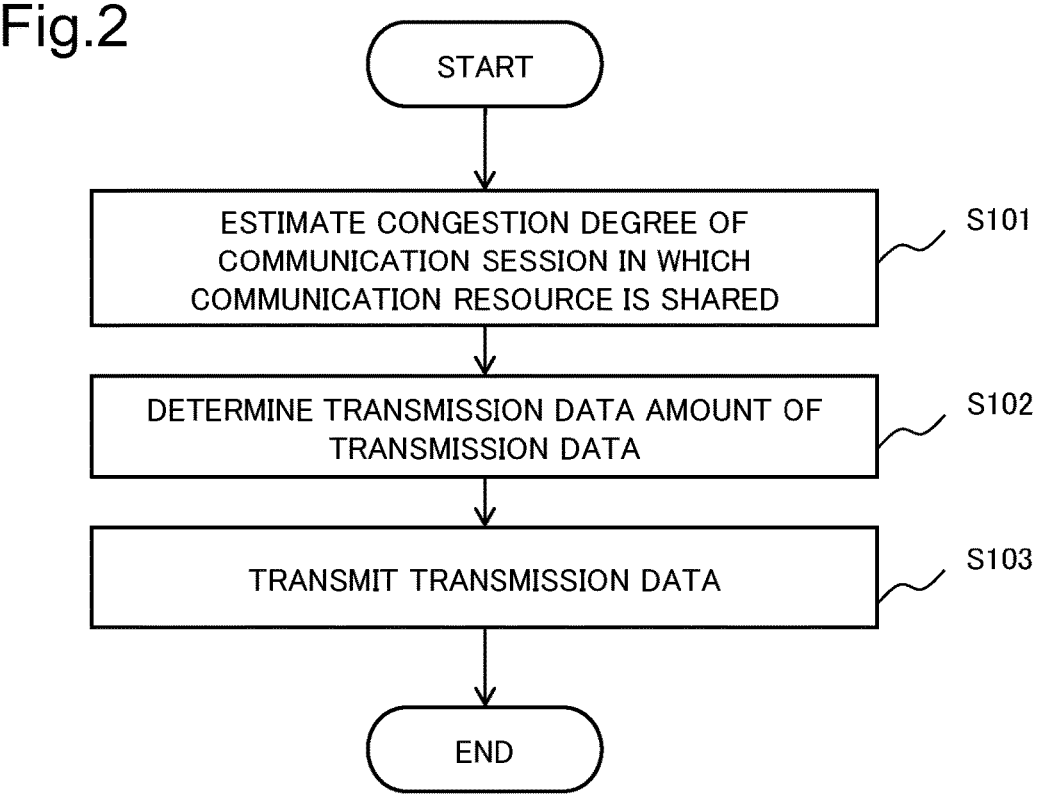
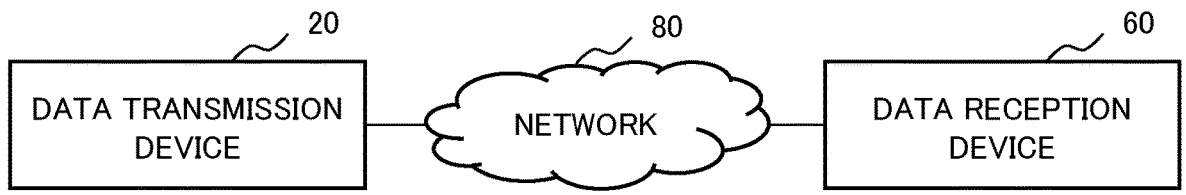

DATA TRANSMISSION DEVICE, METHOD AND RECORDING MEDIUM

CROSS REFERENCE TO RELATED APPLICATIONS

This application is a National Stage of International Application No. PCT/JP2018/023375 filed Jun. 20, 2018, claiming priority based on Japanese Patent Application No. 2017-124336 filed Jun. 26, 2017, the disclosure of which is incorporated herein in its entirety by reference.

TECHNICAL FIELD

The present invention relates to a data transmission device, method, and a recording medium for controlling a data amount of transmission data.

BACKGROUND ART

In recent years, accompanied by spread of a high-performance and high-function mobile terminal such as a smartphone and a tablet terminal, a lifestyle that people enjoy contents such as a video, a photo, and a Website anytime and anywhere via a mobile network has been widely spread. Further, a need for high-speed communication in a mobile network is increasing by a desire to enjoy contents of enhanced quality more comfortably.

In a mobile network, a wireless section between a base station and a user terminal is likely to become a bottleneck. Further, in a wireless section, a communication resource allocated to each of user terminals is shared in all sessions in which the user terminal becomes a destination. Therefore, communication control capable of efficiently utilizing a wireless section in all sessions is important in order to accelerate communication in a mobile network.

On the other hand, there is a transmission control protocol (TCP), as a transport layer protocol, which is widely used both in wired and wireless data communications. The TCP is represented by CUBIC TCP (NPL 1) and TCP NewReno (NPL 2). In the TCP, a data transmission device increases or decreases a transmission rate by trial and error according to determination as to whether or not a network is congested, while transmitting a data packet.

Specifically, in the TCP, when receiving an ACKnowledgement (ACK) packet indicating that a transmitted data packet has normally arrived at a data reception device, a data transmission device determines that the network is not congested, and gradually increases a transmission rate. Further, when packet loss is detected by a duplicated ACK packet or the like, or a round trip time (RTT) becomes larger than a threshold value, the data transmission device determines that the network is congested (crowded), and greatly lowers the transmission rate.

The method of increasing or decreasing a transmission rate of the TCP may cause lowering of throughput, an increase in delay, or an increase in packet retransmission in a mobile network.

Specifically, in a case of a TCP for detecting network congestion by an RTT, an increase in RTT due to a delay accompanied by retransmission control may be misrecognized as network congestion, and throughput may be lowered due to an excessive decrease in transmission rate. Note that, as retransmission control, for example, there are an automatic repeat request (ARQ) technique in a radio link control (RLC) layer, and a hybrid ARQ (HARQ) technique in a media access control (MAC) layer in a wireless section of a mobile network.

Further, in a mobile network, a large capacity buffer is provided in a base station or the like in order to absorb a variation of an available bandwidth or the like. In view of the above, a TCP for detecting network congestion by packet loss may fail to detect packet loss until the network congestion becomes serious, and may excessively transmit data to a network. Then, consequently, the delay remarkably increases. Further, since a large number of packets are lost all at once, or a timeout occurs, due to the serious congestion, packet retransmission frequently occurs.

In this way, when throughput lowering, an increase in delay, or an increase in packet retransmission occurs, experience quality of a user is considerably lowered due to an increase in waiting time until video reproduction is started or a Webpage is displayed, deterioration of an instant message response, and the like. Further, load of a network increases by a retransmitted packet.

On the other hand, in methods described in NPL 3 and PTL 1, data transmission control of bundling a plurality of sessions to a same terminal is performed.

Specifically, in the method described in NPL 3, a total value of amounts of data being in flight in a plurality of sessions to a same terminal is acquired and managed within a TCP/internet protocol (IP) stack of a transmission device. Further, one integrated congestion window is managed in the plurality of sessions to the same terminal. Then, when data to be transmitted are present, and a total value of amounts of data being in flight is smaller than the integrated congestion window, a data packet is transmitted.

Further, in the method described in PTL 1, a total value of amounts of data being in flight in a plurality of sessions to a same terminal is acquired and managed in an application layer, and an amount of data transmittable to the same terminal all at once is managed as a variable threshold value on the basis of an RTT. Then, when data to be transmitted are present, and a total value of amounts of data being in flight is smaller than the variable threshold value, a data packet is transmitted.

In these methods, since data transmission control is performed not by packet loss or an RTT, but by an amount of data being in flight, it is possible to improve throughput lowering, an increase in delay, or an increase in packet retransmission. Further, by performing data transmission control of bundling a plurality of sessions to a same terminal, it is possible to efficiently utilize a communication resource in the plurality of sessions to the same terminal.

However, the methods described in NPL 3 and PTL 1 are proposed, based on a premise that a data transmission device can acquire and manage a total value of amounts of data being in flight to a same terminal. Therefore, when it is not possible to acquire an amount of data being in flight, it is not possible to utilize these methods. For example, when a data transmission device is distributed among a plurality of servers, since each of the servers is only allowed to acquire a part of an amount of data being in flight, it is not possible to calculate a total value of amounts of data being in flight.

Further, in order to enable acquiring a total value of amounts of data being in flight in each of servers, processing for acquiring and managing a total value of amounts of data being in flight to a same terminal by each of the servers in cooperation with another server is necessary. This increases processing load. In order to implement this processing in an actual environment, it is necessary to perform an operation in combination with a measure of suppressing processing load, such as lowering a frequency at which control is performed. This may lead to accuracy deterioration on a total value of amounts of data being in flight.

On the other hand, in the method described in PTL 2, a wireless terminal (data transmission device) estimates a wireless congestion degree indicating a congestion degree of communication in a wireless section, based on a time associated with transmission and reception of a packet being transmitted and received in the wireless section, and performs transmission control, based on the wireless congestion degree. In this method, it is possible to perform transmission control by considering not only a packet to be transmitted and received by the wireless terminal itself but also a packet to be transmitted and received by another wireless terminal in the wireless section.

CITATION LIST

Patent Literature

[PTL 1] International Publication No. WO2015/124187
[PTL 2] Japanese Unexamined Patent Application Publication No. 2016-036083

Non Patent Literature

[NPL 1] Sangtae Ha, and other two, "CUBIC: A New TCP-Friendly High-Speed TCP Variant", Proceedings of the ACM SIGOPS, July 2008, vol. 42, no. 5, pp. 64 to 74
[NPL 2] S. Floyd, and other one, "The NewReno Modification to TCP's Fast Recovery Algorithm", RFC 2582, April 1999
[NPL 3] H. Balakrishnan, and other four, "TCP Behavior of a Busy Internet Server: Analysis and Improvements", Proceedings of IEEE INFOCOM 1998, March 1998, vol. 1, pp. 252 to 262

SUMMARY OF INVENTION

Technical Problem

However, in the method described in PTL 2, in order to estimate a wireless congestion degree, a special configuration in which a packet in a wireless section is monitored, or a notification signal is received from a Passpoint-compliant server is necessary. In view of the above, similarly to the methods described in NPL 3 and PTL 1, there are a problem on processing load by the special configuration, and a problem that a system capable of applying this method is limited.

An object of the present invention is to provide a data transmission device, a method, and a recording medium being capable of controlling a transmission data amount within an appropriate range by an easier method, and achieving throughput improvement, shortening of delay, and suppression of packet retransmission in all communication resources.

Solution to Problem

For settling the above-mentioned problem, a data transmission device of the present invention comprises: a data transmission/reception means for performing transmission of transmission data, based on a transmission data amount; a congestion degree estimation means for estimating a congestion degree of at least a part of communication sessions in which a communication resource to be used in an own session to be used in the transmission of the transmission data is shared, based on communication quality being measurable by the data transmission device itself and relating to the transmission of the transmission data; and a transmission data amount determination means for determining the transmission data amount, based on the congestion degree of the communication session.

And, a data transmission method of the present invention comprises: estimating a congestion degree of at least a part of communication sessions in which a communication resource to be used in an own session to be used in transmission of transmission data is shared, based on communication quality being measurable by a data transmission device and relating to the transmission of the transmission data, the data transmission device performing the transmission of the transmission data; determining a transmission data amount, based on the congestion degree of the communication session; and performing the transmission of the transmission data, based on the transmission data amount.

And, a computer readable recording medium is recorded with a data transmission program of the present invention, the program causing a computer to execute: a data transmission/reception function of performing transmission of transmission data, based on a transmission data amount; a congestion degree estimation function of estimating a congestion degree of at least a part of communication sessions in which a communication resource to be used in an own session to be used in the transmission of the transmission data is shared, based on communication quality being measurable by a data transmission device and relating to the transmission of the transmission data, the data transmission device performing the transmission of the transmission data; and a transmission data amount determination function of determining the transmission data amount, based on the congestion degree of the communication session.

Advantageous Effects of Invention

A data transmission device, a method, and a recording medium according to the present invention are able to control a transmission data amount within an appropriate range by an easier method, and achieve throughput improvement, shortening of delay, and suppression of packet retransmission in all communication resources.

BRIEF DESCRIPTION OF DRAWINGS

FIG. 2 shows an operation example of the data transmission device according to the first example embodiment of the present invention.

FIG. 3 shows a configuration example of a data transmission system according to a second example embodiment of the present invention.

EXAMPLE EMBODIMENT

First Example Embodiment

A first example embodiment according to the present invention is described.

Figure 1:
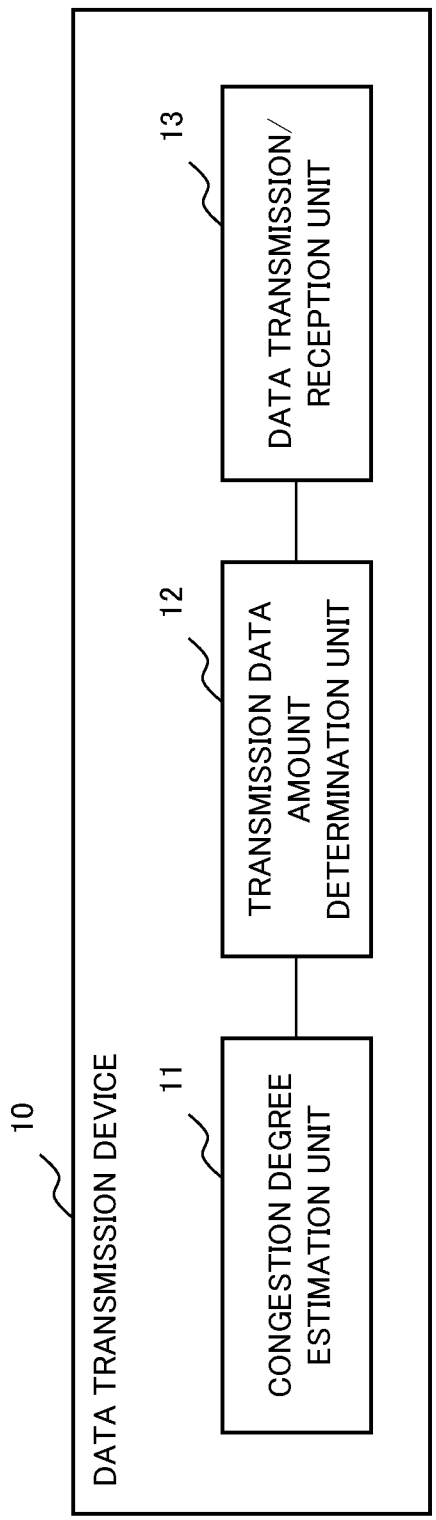
FIG. 1 shows a configuration example of a data transmission device according to a first example embodiment of the present invention.

FIG. 1 illustrates a configuration example of a data transmission device 10 according to the present example embodiment. The data transmission device 10 according to the present example embodiment is constituted by a congestion degree estimation unit 11, a transmission data amount determination unit 12, and a data transmission/reception unit 13.

The data transmission/reception unit 13 is a unit for performing transmission of transmission data, based on a transmission data amount. The congestion degree estimation unit 11 is a unit for estimating a congestion degree of at least a part of communication sessions in which a communication resource to be used in an own session to be used in transmission of transmission data is shared, based on communication quality measurable by the data transmission device 10 itself and relating to the transmission of the transmission data. The transmission data amount determination unit 12 is a unit for determining a transmission data amount, based on the congestion degree of the communication session.

By configuring the data transmission device 10 as described above, the data transmission device 10 estimates a congestion degree of at least a part of communication sessions in which a communication resource to be used in an own session is shared, based on communication quality measurable by the data transmission device 10 itself. Then, the data transmission device 10 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Next, an operation example of the data transmission device 10 according to the present example embodiment is described with reference to FIG. 2.

First, the congestion degree estimation unit 11 estimates a congestion degree of at least a part of communication sessions in which a communication resource to be used in an own session to be used in transmission of transmission data by the data transmission device 10 itself is shared, based on communication quality measurable by the data transmission device 10 itself and relating to the transmission of the transmission data (Step S101). Next, the transmission data amount determination unit 12 determines a transmission data amount of transmission data, based on the congestion degree of the communication session (Step S102). Then, the data transmission/reception unit 13 performs transmission of transmission data, based on the transmission data amount (Step S103).

By proceeding as described above, the data transmission device 10 estimates a congestion degree of at least a part of communication sessions in which a communication resource to be used in an own session is shared, based on communication quality measurable by the data transmission device 10 itself. Then, the data transmission device 10 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

As described above, in the first example embodiment according to the present invention, the data transmission device 10 estimates a congestion degree of at least a part of communication sessions in which a communication resource to be used in an own session is shared, based on communication quality measurable by the data transmission device 10 itself. Then, the data transmission device 10 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Further, it becomes possible to apply the data transmission device 10 according to the present example embodiment to a larger number of systems.

Second Example Embodiment

Next, a second example embodiment according to the present invention is described. In the present example embodiment, a data transmission device is more specifically described.

FIG. 3 illustrates a configuration example of a data transmission system employing a data transmission device 20 according to the present example embodiment.

The data transmission device 20 is a data transmission device for transmitting requested data by establishing connection such as a TCP with respect to a data reception device 60.

The data transmission device 20 can be functioned as an origin server for storing data requested from a user, for example. Further, the data transmission device 20 can be functioned as a relay server device, which is disposed within a network 80, such as a cache server, a proxy server, or an edge server, for example, and configured to temporarily terminate data communication between an origin server and the data reception device 60.

Note that the data transmission device 20 may be disposed at a midway of a route along which an origin server transmits data to the data reception device 60. In this case, another network, an origin server, or the like may be disposed beyond the data transmission device 20, when viewed from the data reception device 60.

The data reception device 60 is a device for transmitting a data request to the data transmission device 20 via the network 80, and receiving a data packet transmitted from the data reception device 20. For example, a personal computer (PC), a mobile terminal, or the like is equivalent to the data reception device 60.

When being requested a data acquisition from a user, the data reception device 60 transmits, to the data transmission device 20 or an origin server, a data request via the network 80. Further, when receiving a data packet from the data transmission device 20, the data reception device 60 transmits, to the data transmission device 20, an ACK packet associated with the data packet. Then, when the requested data are distributed from the data transmission device 20 or an origin server, the data reception device 60 presents a user with the data.

Figure 4:
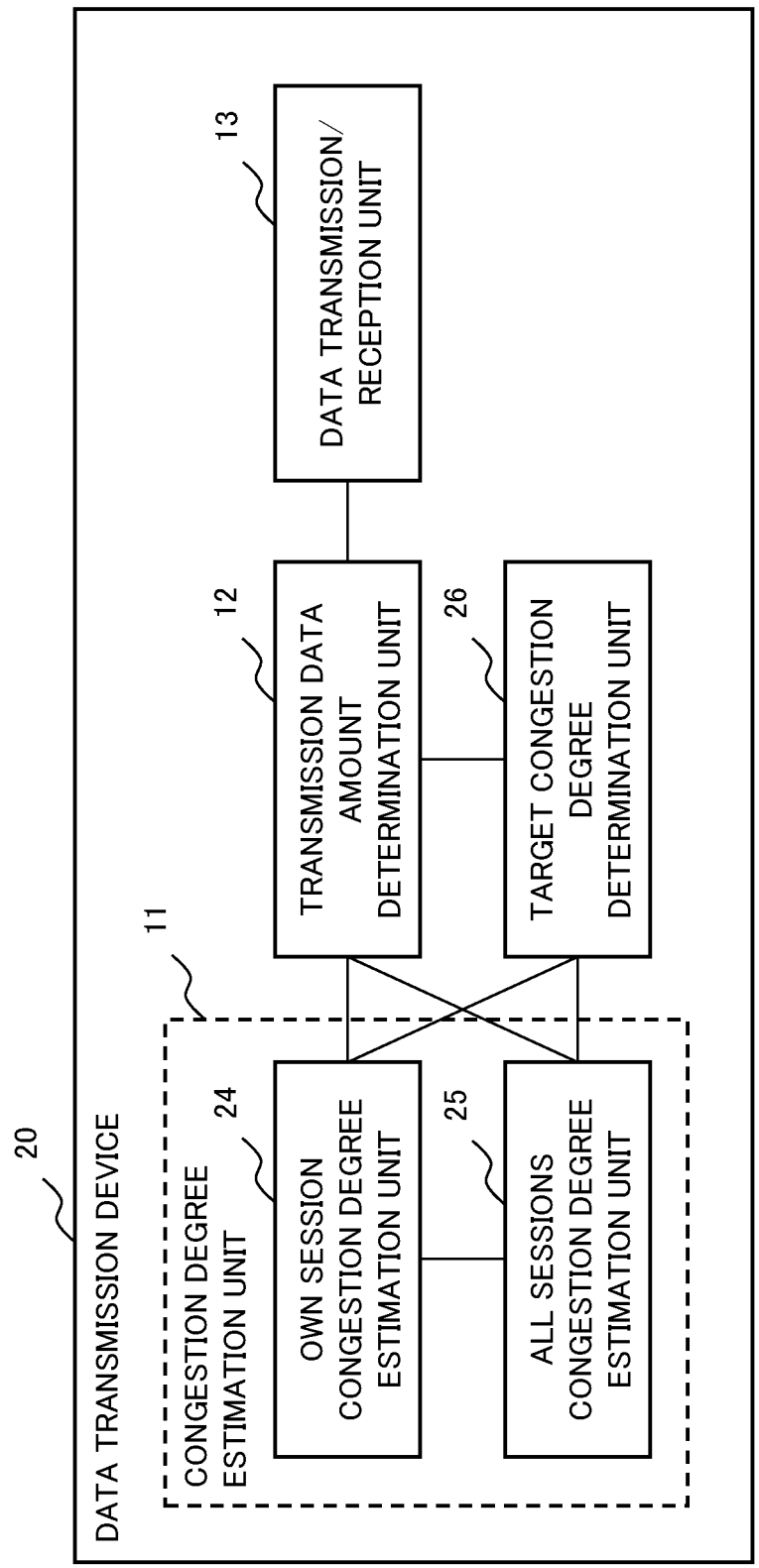
FIG. 4 shows a configuration example of a data transmission device according to the second example embodiment of the present invention.

FIG. 4 is a diagram illustrating a configuration example of the data transmission device 20 in the present example embodiment. In FIG. 4, a target congestion degree determination unit 26 is added to the configuration example (FIG. 1) of the data transmission device 10. Further, a congestion degree estimation unit 11 is constituted by an own session congestion degree estimation unit 24 and an all sessions congestion degree estimation unit 25.

First, a data transmission/reception unit 13 is described. The data transmission/reception unit 13 is a unit for transmitting transmission data, based on a data packet amount (transmission data amount), which is determined to be transmittable all at once by a transmission data amount determination unit 12.

When receiving a data request message from the data reception device 60, the data transmission/reception unit 13 transmits, to the data reception device 60, a requested data packet via the network 80 according to the transmission data amount determined by the transmission data amount determination unit 12. Further, the data transmission/reception unit 13 receives an ACK packet.

Further, the data transmission/reception unit 13 measures communication quality relating to data transmission and reception with respect to the data reception device 60.

Specific examples of communication quality are described as follows. In the data transmission/reception unit 13, one or more of these pieces of information (communication quality) are measured. Note that these pieces of information are easily measurable information, without introducing a special configuration to the data transmission device 20 or a data transmission system.

A round trip time (RTT) for communication between the data transmission device 20 and the data reception device 60
A point of time when an ACK packet is received
A time interval at which an ACK packet is received (a difference between a point of time when a preceding ACK packet is received, and a point of time when a current ACK packet is received)
An amount of data of which reception is newly acknowledged by an ACK packet
An amount of data being in flight (an amount of data for which a data packet is already transmitted, but of which reception is not acknowledged by an ACK packet)
A maximum segment size (MSS)

Further, the data transmission/reception unit 13 may store an observation value on the above-described information for a predetermined time in the past, and measure one or more pieces of information on an accumulated value, an average value, a variance, a standard deviation, a maximum value, and a minimum value of the observation value, and a difference between the maximum value and the minimum value. Further, the data transmission/reception unit 13 may measure information in which statistical processing such as a filter method in which an influence of an instantaneous variation is eliminated, or an index moving average is added to the above-described information.

Further, the data transmission/reception unit 13 may measure one or more pieces of information measurable by an ACK packet, as described in the following examples.

A receive window size (RWIN)
Data packet loss (phenomenon that a data packet is lost within a network) or a duplicated ACK which implies an order discrepancy
A rate of occurrence of data packet loss (packet loss rate)
A message of explicit congestion notification (ECN)

Next, the congestion degree estimation unit 11 is described. The congestion degree estimation unit 11 is a unit for estimating a congestion degree of at least a part of communication sessions in which a communication resource to be used in an own session to be used in transmission of transmission data by the data transmission device 20 is shared. In the present example embodiment, the congestion degree estimation unit 11 estimates a congestion degree, based on communication quality measured by the data transmission/reception unit 13. Further, in the present example embodiment, the congestion degree estimation unit 11 is constituted by the own session congestion degree estimation unit 24 and the all sessions congestion degree estimation unit 25.

Next, the own session congestion degree estimation unit 24 is described. The own session congestion degree estimation unit 24 is a unit for estimating a congestion degree of a communication resource in a communication session (own session) to be used in data transmission and reception by the data transmission/reception unit 13, based on communication quality.

As the congestion degree, any index may be used, as far as the index can estimate a magnitude of congestion of a communication resource. For example, it is possible to determine that a network is congested, when an amount of retention data relating to data retaining in network equipment constituting a network, and transmitted by the data transmission device 20 increases, for example. Therefore, it is possible to employ, as the congestion degree, an amount of retention data relating to data transmitted by the data transmission device 20.

Further, as other examples of the congestion degree, the following examples are described.

An amount of data being in flight
An increment in the amount of retention data or the amount of data being in flight within a predetermined period in the past
A decrement in frequency of arrival of an ACK packet
A decrement in communication resource, which is estimated from an amount of data of which reception is acknowledged by an ACK packet, and an arrival interval of the ACK packet
A frequency of occurrence of data packet loss
An increment in RTT Note that, in the method described in PTL 2, a use rate of a communication resource is employed as a wireless congestion degree. In this method, it is only possible to measure a congestion degree up to 100% at maximum. Therefore, it is not possible to determine whether the congestion degree is appropriate or excessive, or how much the congestion exceeds. In view of the above, as exemplified above, it is desirable to employ, as the congestion degree, an index capable of indicating a degree of congestion, when excessive data transmission is performed.

In the present example embodiment, hereinafter, a case that an amount of retention data is employed as the congestion degree is described.

Next, an example of a method of estimating an amount of retention data in an own session is described.

The retention data are data retaining in a buffer, which is present in network equipment such as a router or a switch constituting a network, a gateway device, or a base station device. The amount of retention data can be estimated, for example, by subtracting, from an amount of data being in flight that is measured by the data transmission/reception unit 13, an amount of non-retention data.

The non-retention data are data being in flight within a network, without retaining in a buffer, which is present in network equipment such as a router or a switch constituting the network, a gateway device, or a base station device.

Next, an example of a method of estimating an amount of non-retention data is described.

The own session congestion degree estimation unit 24 estimates the amount of non-retention data, for example, by calculating a product of an estimated value (estimated bandwidth value) of a communication band and an estimated value (estimated delay value) of a transmission delay time.

Figure 5:
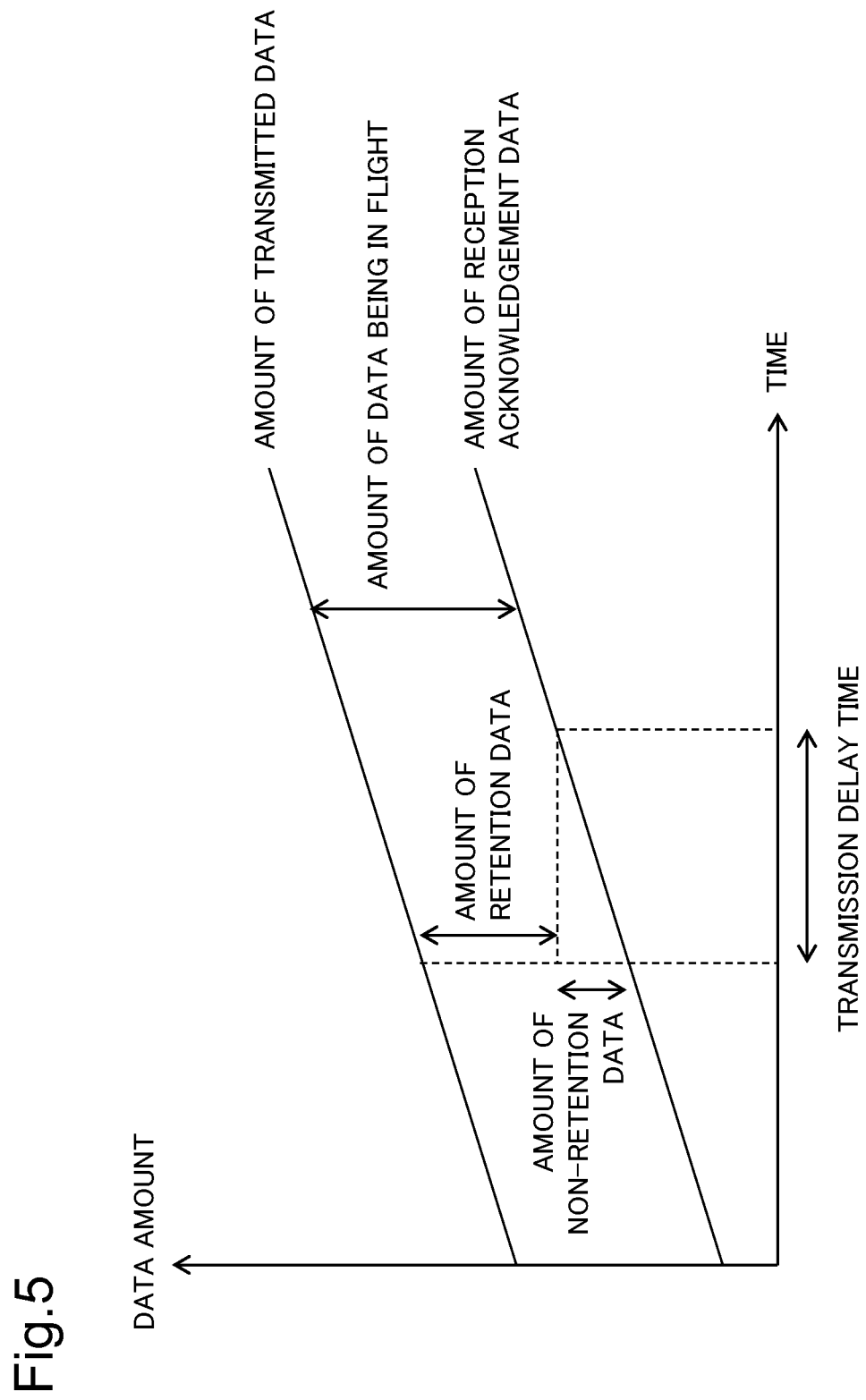
FIG. 5 shows a congestion degree estimation method of the data transmission device according to the second example embodiment of the present invention.

FIG. 5 illustrates an example of a relationship among each of data amounts. The amount of transmitted data is an amount of data transmitted from the data transmission device 20 to the data reception device 60. The amount of reception acknowledgement data is an amount of data of which reception is acknowledged by an ACK packet received from the data reception device 60. Then, a value acquired by subtracting, from the amount of transmitted data, the amount of reception acknowledgement data, is an amount of data being in flight. In other words, the amount of data being in flight is a data amount of data that are transmitted from the data transmission device 20, but that do not yet receive an ACK packet.

It is possible to classify the data being in flight into retention data retaining in network equipment, and non-retention data being in flight without retaining. It is possible to consider that an ACK packet can be received before a transmission delay time elapses, since the non-retention data are being in flight. Therefore, the own session congestion degree estimation unit 24 in the present example embodiment estimates an amount of data of which reception is acknowledged before a transmission delay time elapses, specifically, a product of an estimated value of a communication band and an estimated value of a transmission delay time, as the amount of non-retention data.

The communication band is an amount of transmission data per unit time. Specifically, it is possible to estimate the communication band by dividing an amount of data of which reception is acknowledged within a predetermined period by an elapsed time (reception time interval) required for receiving the data. The predetermined period may be a predetermined time interval, or may be the number of received ACK packets.

It is possible to estimate the amount of data of which reception is acknowledged within the predetermined period, for example, by calculating an amount of data of which reception is newly acknowledged by an ACK packet, which is received by the data transmission/reception unit 13 within the predetermined period. Further, a value acquired by adding statistical processing such as an index moving average to the data amount may be employed as the amount of reception acknowledgement data.

It is possible to acquire the reception time interval, for example, by subtracting, from a point of time when a latest ACK packet among ACK packets received by the data transmission/reception unit 13 within a predetermined period is received, a point of time when an earliest ACK packet is received. Further, a value acquired by adding statistical processing such as an index moving average to the reception time interval may be employed as the reception time interval.

It is possible to estimate the transmission delay time by calculating a minimum value or an index moving average value of a round trip time for communication between the data transmission device 20 and the data reception device 60.

Further, a communication band varies by a change in allocation amount of a resource block in a base station device, a variation of radio wave quality in a mobile network, or the like. Furthermore, a transmission delay time varies by delay relating to retransmission by handover of a user terminal, an ARQ technique in an RLC layer, an HARQ technique in a MAC layer, or the like. In view of the above, a filter method in which an influence of an instantaneous variation is eliminated may be applied to the above-described estimated bandwidth value or/and the above-described estimated delay value.

The own session congestion degree estimation unit 24 can estimate an amount of retention data in an own session by subtracting, from an amount of data being in flight that is measured by the data transmission/reception unit 13, the above-described amount of non-retention data.

Next, the all sessions congestion degree estimation unit 25 is described. The all sessions congestion degree estimation unit 25 is a unit for estimating a congestion degree of at least a part of communication sessions in which a communication resource to be used in an own session is shared. The all sessions congestion degree estimation unit 25 in the present example embodiment estimates, as a congestion degree of a communication session, congestion degrees of all sessions in which a communication resource to be used in an own session is shared. Further, in the present example embodiment, similarly to the own session congestion degree estimation unit 24, the all sessions congestion degree estimation unit 25 also employs an amount of retention data, as the congestion degree.

Next, an example of a method of estimating an amount of retention data in all sessions is described.

For example, the all sessions congestion degree estimation unit 25 estimates a session number of communication sessions in which a communication resource to be used in an own session is shared. Then, it is possible to estimate an amount of retention data in all sessions by calculating a product of the amount of retention data in the own session estimated by the own session congestion degree estimation unit 24, and the estimated number of sessions.

Further, for example, the all sessions congestion degree estimation unit 25 may estimate an amount of retention data in all sessions by calculating a product of an available bandwidth and a queuing delay. The available bandwidth can be estimated, for example, based on a maximum value of throughput of an own session at a predetermined time interval. Further, the queuing delay can be estimated, based on a difference between a statistical transmission delay time, and a minimum value of a transmission delay time. The transmission delay time varies by an increase in delay time accompanied by retransmission control such as an ARQ technique or an HARQ technique in a wireless section, a variation of transmission delay accompanied by a bandwidth variation in a wireless section, a variation of processing delay accompanied by a change in congestion degree in a mobile core network, and the like. The statistical transmission delay time is a transmission delay time acquired by adding statistical processing such as a filter method in which an influence of an instantaneous variation on such transmission delay time is eliminated, or an index moving average.

Next, a method of estimating a session number is described.

The all sessions congestion degree estimation unit 25 can estimate a session number, for example, by dividing an amount of retention data in all sessions by an amount of retention data in an own session, or dividing a maximum value of throughput in an own session at a predetermined time interval by an average value.

Further, the all sessions congestion degree estimation unit 25 can also estimate the session number as follows. First, the data transmission/reception unit 13 measures in advance a value distribution or a statistical value measurable in an own session, such as a transmission delay time, a variation width of a transmission delay time, an arrival interval of a data packet or an ACK packet, or throughput. Further, the data transmission/reception unit 13 measures the above-described value distribution or statistical value to be observed in the own session during communication. Then, when the session number is changed, the all sessions congestion degree estimation unit 25 calculates a degree of approximation between the value measured or calculated in advance, and the value measured or calculated during communication, by using a method such as a hypothesis test method or a Bayesian estimation method, and estimates the session number, based on the degree of approximation.

Furthermore, the all sessions congestion degree estimation unit 25 can also estimate the session number as follows. When an amount of data retaining in network equipment exceeds a predetermined amount, a congestion detection flag of explicit congestion notification (ECN) is appended to an ACK packet. By using the congestion detection flag, when the data transmission/reception unit 13 receives the ACK packet being appended with the congestion detection flag, the all sessions congestion degree estimation unit 25 estimates the predetermined amount, as the amount of retention data in all sessions. Then, the all sessions congestion degree estimation unit 25 sets, as the estimated number of sessions, a value acquired by dividing the amount of retention data in the own session by the predetermined amount at the point of time.

Next, the target congestion degree determination unit 26 is described. The target congestion degree determination unit 26 is a unit for determining a target congestion degree being a target value of a congestion degree, based on communication quality. The target congestion degree determination unit 26 determines the target congestion degree, based on a congestion degree of an own session estimated by the own session congestion degree estimation unit 24, or a congestion degree of all sessions estimated by the all sessions congestion degree estimation unit 25. Note that a same unit or scale index as the congestion degree to be estimated by the congestion degree estimation unit 11 is employed, as the congestion degree herein. The target congestion degree is a congestion degree to be aimed at when the transmission data amount determination unit 12 determines an upper limit of a transmission data amount.

For example, when a radio wave condition is drastically improved, and an amount of transmittable data drastically increases, an excessively low amount of retention data (congestion degree) of a communication resource may generate a state that data are transmittable in terms of band, but there are no data to be transmitted. In other words, utilization efficiency of a transmission band is lowered. Even when an amount of transmittable data drastically increases, as far as there is some degree of congestion of a communication resource, it is possible to suppress a state that it is not possible to efficiently utilize a transmission band, namely, there are no data to be transmitted despite a transmittable state, since it is possible to transmit retention data. On the other hand, an excessively high congestion degree of a communication resource may lower experience quality, because arrival of data to a data reception device is delayed, or start of another communication session is delayed. In view of the above, by determining an appropriate target congestion degree, based on a variation amount of communication quality, it becomes possible to suppress lowering of utilization efficiency of a transmission band, and improve experience quality of a user.

More specifically, when a degree of stability of communication quality is low, specifically, when a variation amount of communication quality is large, a target congestion degree of a communication resource is increased depending on the variation amount of communication quality. This enables to suppress depletion of transmission data, even when an amount of transmittable data drastically increases, and more efficiently utilize a transmission band, since the congestion degree of the communication resource increases. When a variation amount of communication quality is large, a variation of delay also increases. In view of the above, by increasing a congestion degree, while accepting delay to some extent, it is possible to more efficiently utilize a transmission band, and it becomes possible to transmit a larger amount of data. Further, when a degree of stability of communication quality is high, specifically, a variation amount of communication quality is small, a target congestion degree of a communication resource is decreased depending on the variation amount of communication quality. This enables to decrease delay of data, since the congestion degree of a network is lowered. Therefore, by increasing a target congestion degree, as a variation amount of communication quality increases, it becomes possible to suppress lowering of utilization efficiency of a transmission band, and improve experience quality of a user.

Next, an example of a method of determining a target congestion degree is described. As described above, in the present example embodiment, a target congestion degree is increased, as a variation amount of communication quality increases. Note that, in the following, "a congestion degree of an own session or a congestion degree of all sessions" is described as "a congestion degree".

For example, it is possible to set, as a variation amount, a variance, a standard deviation, or a difference between a maximum value and a minimum value of a congestion degree estimated by the congestion degree estimation unit 11 within a predetermined period in the past, and set a product of the variation amount and a predetermined coefficient, as the target congestion degree. This enables to express the variation amount of communication quality as an index, and increase the target congestion degree depending on an increase in the variation amount.

Further, it is possible to calculate a variation amount by calculating a variance, a standard deviation, or a difference between a maximum value and a minimum value, after eliminating, from a value of a congestion degree estimated by the congestion degree estimation unit 11 within a predetermined period in the past, an abnormal value (greatly deviated value) by existing statistical processing. Furthermore, it is possible to calculate the target congestion degree, based on a value acquired by performing index moving average calculation with respect to a variation amount calculated a plurality of times.

Further, it is possible to set, as a variation amount, a variance, a standard deviation, or a difference between a maximum value and a minimum value of a reception interval of an ACK packet within a predetermined period in the past. For example, it is possible to determine the target congestion degree according to a predetermined monotonously increasing function in a broad sense in which an increase width of the target congestion degree is increased, as the variation amount increases, and an increase width of the target congestion degree is decreased (target congestion degree may be decreased), as the variation amount decreases, by starting from a predetermined initial value. This enables to determine the target congestion degree, based on a variation amount of a reception interval of an ACK packet.

Furthermore, it is possible to determine the target congestion degree by calculating a variation amount of a congestion degree by analyzing a degree of stability on a timewise change of a congestion degree from a tendency or a correlation of a plurality of congestion degrees within a predetermined period in the past, and based on the degree of stability (variation amount). For example, it is possible to determine the target congestion degree according to a predetermined monotonously decreasing function in a broad sense in which the target congestion degree is decreased, as the degree of stability is higher (variation amount decreases), and the target congestion degree is increased, as the degree of stability is lower (variation amount increases). Further, it is possible to calculate the degree of stability according to an existing detection method on constancy, such as a unit root test, a co-integration test, or autocovariance analysis, for example.

In addition, it is possible to determine the target congestion degree not based on a variation amount of communication quality, but based on communication quality such as an RTT or a packet loss rate. For example, it is possible to determine the target congestion degree according to a predetermined monotonously decreasing function in a broad sense in which an increase width of the target congestion degree is decreased (target congestion degree may decrease), as the RTT or the packet loss rate is larger, and an increase width of the target congestion degree is increased, as the RTT or the packet loss rate is smaller, by starting from a predetermined initial value. In this method, the target congestion degree is decreased by regarding that a congestion degree is excessive, when a delay or a packet loss rate is large.

Next, modification of a target congestion degree is described.

In the above-described method of determining a target congestion degree, the target congestion degree determination unit 26 can determine a target congestion degree of an own session or a target congestion degree of all sessions. However, when a target congestion degree determined by the target congestion degree determination unit 26 is a target congestion degree of an own session, the target congestion degree is a target congestion degree without considering an influence of another session. In view of the above, the target congestion degree determination unit 26 in the present example embodiment performs modification, according to the following method, with respect to a target congestion degree of an own session calculated by the above-described method, and sets the modified target congestion degree, as a target congestion degree of an own session considering an influence of another session.

The target congestion degree determination unit 26 estimates a session number of communication sessions in which a communication resource is shared with an own session, and modifies the target congestion degree in such a way that the target congestion degree decreases, as the estimated number of sessions is larger. It is possible to estimate the session number by a method similar to a method described in the method of estimating an amount of retention data in all sessions. The target congestion degree determination unit 26 modifies the target congestion degree by a method such as a method in which the target congestion degree is divided by an estimated number of sessions or a logarithmic value of an estimated number of sessions, for example.

By modifying the target congestion degree as described above, since a ratio of a congestion degree of an own session with respect to a congestion degree of all sessions decreases, when a congestion degree of another session is large, the target congestion degree after modification is remarkably decreased, as compared with a case before modification. Conversely, since a congestion degree of an own session with respect to a congestion degree of all sessions increases, when a congestion degree of another session is small, the target congestion degree after modification is not decreased so much, as compared with a case before modification. In this way, since the data transmission device 20 in the present example embodiment determines the target congestion degree by considering a congestion degree of another session, it becomes possible to more appropriately control a congestion degree as all communication resources.

Note that, when the target congestion degree determined by the target congestion degree determination unit 26 is a target congestion degree of all sessions, the transmission data amount determination unit 12 determines a transmission data amount considering an influence of another session, without performing modification with respect to the target congestion degree in the target congestion degree determination unit 26.

Next, the transmission data amount determination unit 12 is described. The transmission data amount determination unit 12 is a unit for determining a transmission data amount, based on a congestion degree of an own session or a congestion degree of all sessions, and a target congestion degree.

It is possible to set the transmission data amount, as an upper limit of a transmission data amount, as exemplified by a congestion window size (cwnd). Further, the upper limit may be a size of data transmittable within a predetermined time in a user datagram protocol (UDP) and the like. Furthermore, the upper limit may be a set value (SO_SND-BUF) of a transmission buffer size of communication connection, a memory size (tcp_wmem) usable in communication set as a system parameter, or a receive window size (RWIN) to be notified by an ACK packet. Hereinafter, a case that an upper limit of a transmission data amount is determined as the transmission data amount is described.

Note that there are two patterns in a method of determining a transmission data amount.

A first pattern is a pattern in which a transmission data amount of an own session is determined, based on a congestion degree of the own session and a target congestion degree (after modification) of the own session. A second pattern is a pattern in which a transmission data amount of an own session is determined, based on a congestion degree of all sessions and a target congestion degree (without modification) of the all sessions.

In a case of the second pattern, the transmission data amount determination unit 12 determines a transmission data amount of an own session by considering an influence of another session such as an estimated number of sessions, based on a congestion degree of all sessions and a target congestion degree of the all sessions. Alternatively, the transmission data amount determination unit 12 may determine a transmission data amount of all sessions, based on a congestion degree of the all sessions and a target congestion degree of the all sessions, and modify a transmission data amount of the all sessions to a transmission data amount of an own session by a method similar to modification of a target congestion degree.

In any of the patterns, it is possible to employ a similar method regarding a unit for determining a transmission data amount, based on a congestion degree and a target congestion degree.

An example of a method of determining a transmission data amount is described as follows. A congestion degree of a network increases, as a transmission data amount is increased. In view of the above, it is possible to make a congestion degree approximate to a target congestion degree by increasing the transmission data amount, when a congestion degree is smaller than a target congestion degree, and by decreasing the transmission data amount, when a congestion degree is larger than a target congestion degree.

For example, a value acquired by subtracting a congestion degree from a target congestion degree is multiplied (or powered with a predetermined exponent) by a predetermined coefficient, and a value acquired by adding the multiplication result to a current upper limit is determined as a new upper limit. Then, it becomes possible to decrease the upper limit of the transmission data amount, when a congestion degree is larger than a target congestion degree, and it becomes possible to increase the upper limit, when a congestion degree is smaller than a target congestion degree.

Further, a sum of one or more values acquired by subtracting a congestion degree from a target congestion degree in a history in the past is multiplied by a predetermined coefficient, and a value acquired by adding the multiplication result to a current upper limit may be set as a new upper limit. Furthermore, a unit change amount, per number of calculations or time, between a latest value, and a value earlier than the latest value by a predetermined number of calculations or a predetermined time, regarding a value acquired by subtracting a congestion degree from a target congestion degree is calculated and multiplied by a predetermined coefficient, and a value acquired by adding the multiplication result to a current upper limit may be set as a new upper limit. Moreover, a new upper limit may be determined by combining two or more of the above-described upper limit determination methods.

Further, for example, when an upper limit is cwnd, an existing method of increasing or decreasing cwnd of a TCP such as CUBIC TCP (NPL 1) or TCP NewReno (NPL 2) may be combined. For example, a function of adjusting in such a way as to decrease a decrement by increasing an increment of cwnd, as a value acquired by subtracting a congestion degree from a target congestion degree or dividing a congestion degree by a target congestion degree increases may be added to an existing increasing and decreasing method. By configuring as described above, it becomes possible to make a congestion degree approximate to a target congestion degree more quickly.

By determining a transmission data amount as described above, in a case of the above-described first pattern, it is possible to determine a transmission data amount of an own session in such a way that a congestion degree of the own session is approximated to a target congestion degree considering another session.

Further, in a case of the second pattern, when a congestion degree of all sessions is smaller than a target congestion degree of the all sessions, since a communication resource is sufficient, a transmission data amount of an own session increases. Furthermore, when a congestion degree of all sessions is larger than a target congestion degree of the all sessions, since a communication resource is congested, a transmission data amount of an own session decreases. In this way, also by the second pattern, it is possible to determine a transmission data amount of an own session by considering another session.

By configuring the data transmission device 20 as described above, the data transmission device 20 estimates a congestion degree of at least a part of communication sessions in which a communication resource to be used in an own session is shared, based on communication quality measurable by the data transmission device 20 itself. Then, the data transmission device 20 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Figure 6:
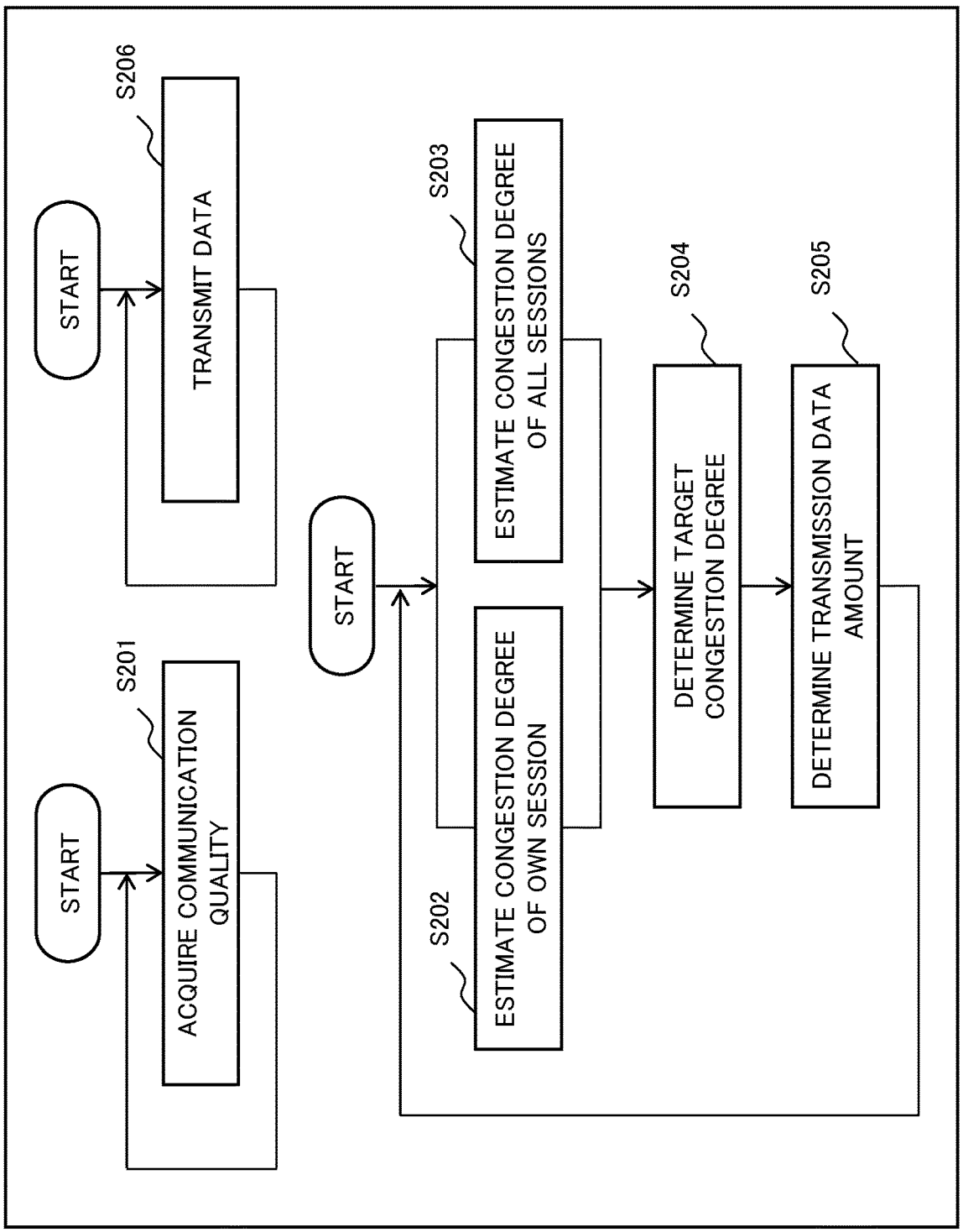
FIG. 6 shows an operation example of the data transmission device according to the second example embodiment of the present invention.

Next, FIG. 6 illustrates an operation example of the data transmission device 20 in the present example embodiment. Step S203 in FIG. 6 corresponds to Step S101 in FIG. 2, Steps S204 and S205 in FIG. 6 correspond to Step S102 in FIG. 2, and Step S206 in FIG. 6 corresponds to Step S103 in FIG. 2.

First, the data transmission/reception unit 13 measures communication quality at a predetermined timing such as a point of time when the data transmission/reception unit 13 receives an ACK packet from the data reception device 60, or a predetermined time interval (Step S201).

The congestion degree estimation unit 11 estimates a congestion degree of an own session and a congestion degree of all sessions at a predetermined timing, based on communication quality (Steps S202 and S203). The predetermined timing herein is, for example, a point of time when the data transmission/reception unit 13 receives an ACK packet from the data reception device 60, a predetermined time interval, or the like.

Next, the target congestion degree determination unit 26 determines a target congestion degree, based on the congestion degree of the own session or the congestion degree of the all sessions at a predetermined timing (Step S204). The predetermined timing herein is, for example, a point of time when the congestion degree estimation unit 11 estimates a congestion degree of an own session or all sessions, a predetermined time interval, or the like.

Then, the transmission data amount determination unit 12 determines a transmission data amount, based on the congestion degree and the target congestion degree, at a predetermined timing such as a point of time when the congestion degree estimation unit 11 estimates a congestion degree of the own session or the all sessions, or a predetermined time interval (Step S205).

When receiving, from the data reception device 60, a data request message, the data transmission/reception unit 13 transmits, to the data reception device 60, a requested data packet according to the transmission data amount determined by the transmission data amount determination unit 12 (Step S206).

Herein, in a case where the data transmission device 20 is an origin server, since the data transmission device 20 stores all pieces of original data by itself, the data transmission/reception unit 13 can transmit data according to the transmission data amount determined by the transmission data amount determination unit 12. In a case where the data transmission device 20 is a relay server device, it is preferable to store original data in advance in a storage area of the data transmission device 20 itself as cache data, or temporarily store a data stream received from an origin server in a buffer. By configuring as described above, the data transmission/reception unit 13 is able to transmit data according to the transmission data amount determined by the transmission data amount determination unit 12, without depending on throughput of a network between the origin server and the data transmission device 20.

By proceeding as described above, the data transmission device 20 estimates a congestion degree of at least a part of communication sessions in which a communication resource to be used in an own session is shared, based on communication quality measurable by the data transmission device 20 itself. Then, the data transmission device 20 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Note that, in the foregoing, description is made based on a premise that a protocol of a transport layer is a TCP. However, the data transmission device in the present example embodiment is also applicable to a data transmission device in which a transmission data amount is controlled by employing a protocol different from a TCP such as a UDP, and simulating a behavior of the TCP in a transport layer or an upper layer.

As described above, in the second example embodiment according to the present invention, the data transmission device 20 estimates a congestion degree of at least a part of communication sessions in which a communication resource to be used in an own session is shared, based on communication quality measurable by the data transmission device 20 itself. Then, the data transmission device 20 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Further, it becomes possible to apply the data transmission device 20 according to the present example embodiment to a larger number of systems.

Furthermore, the data transmission device 20 in the present example embodiment determines a target congestion degree, based on a variation of communication quality. Thus, it becomes possible to control a transmission data amount in an appropriate range even in a mobile network by considering an influence of a bandwidth variation or a delay variation.

Third Example Embodiment

Next, a third example embodiment according to the present invention is described. The present example embodiment is an example of a case that there are a plurality of own sessions in which a data transmission device transmits transmission data, and the own sessions are divided into a plurality of groups by a transmission control parameter or the like.

Figure 7:
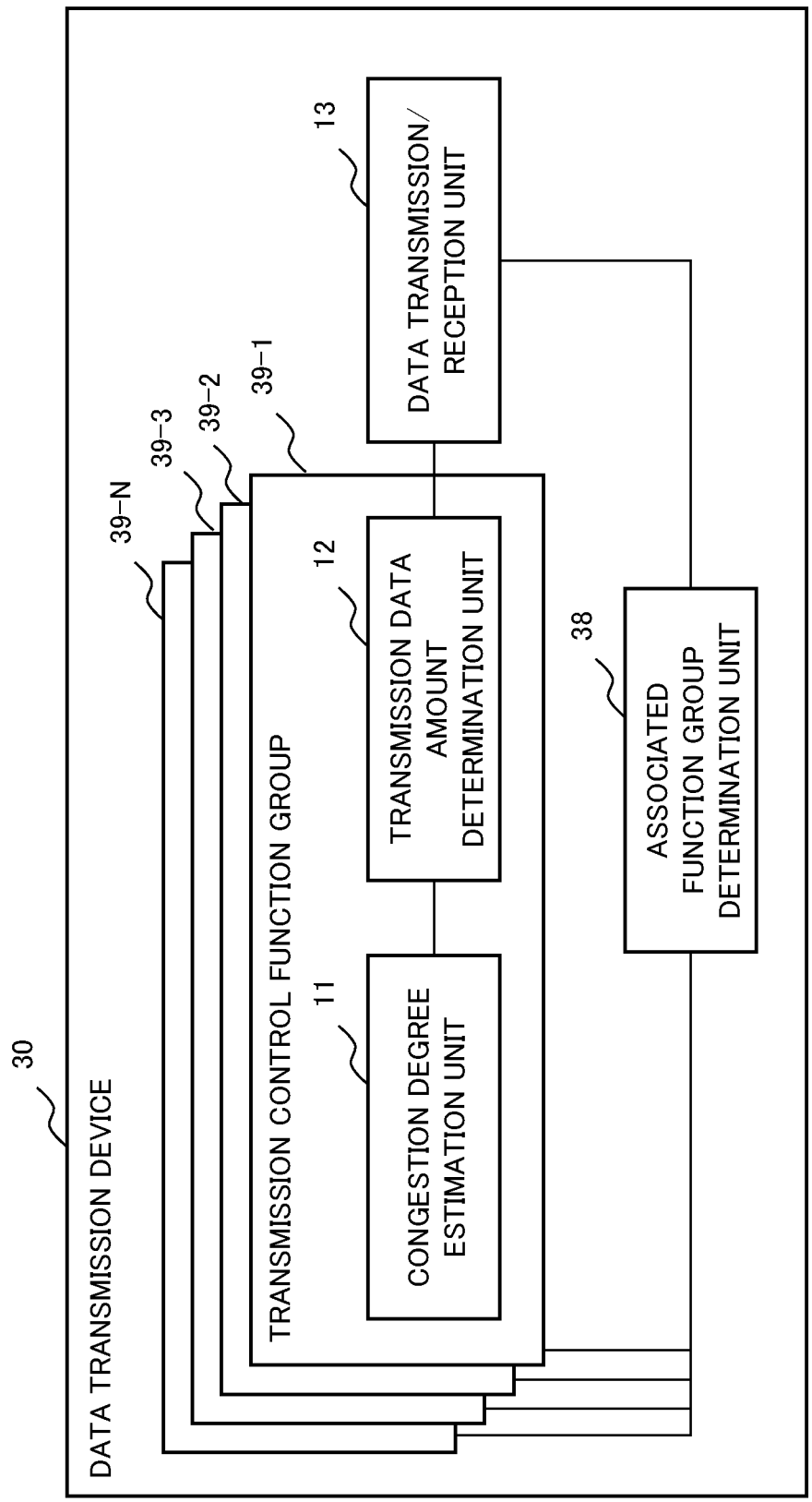
FIG. 7 shows a configuration example of a data transmission device according to a third example embodiment of the present invention.

FIG. 7 illustrates a configuration example of a data transmission device 30 in the present example embodiment. The data transmission device 30 in the present example embodiment is constituted by a data transmission/reception unit 13, an associated function group determination unit 38, and transmission control function groups 39 (39-1 to 39-N). Each of the transmission control function groups 39 includes a congestion degree estimation unit 11 and a transmission data amount determination unit 12. Note that each of the transmission control function groups 39 may further include a target congestion degree determination unit 26.

Since the congestion degree estimation unit 11, the transmission data amount determination unit 12, and the data transmission/reception unit 13 are similar to those in the first example embodiment, description thereof is omitted.

The transmission control function group 39 (39-1 to 39-N) is a unit for determining a transmission data amount to a group of an own session allocated to an own function. Each of the transmission control function groups 39 determines a transmission data amount independently. The transmission control function group 39 is allocated each to a group of communication sessions in which a communication resource is shared. For example, a group of communication sessions is a group of a part of communication sessions belonging to a same quality of service (QoS) class, such as a QoS class in a long term evolution (LTE) network.

The associated function group determination unit 38 is a unit for determining the transmission control function group 39 (39-1 to 39-N) which performs transmission control of each of own sessions, and notifying to the determined transmission control function group 39.

For example, when the data transmission device 30 is a base station device or a packet data network gateway (P-GW) in a mobile network, the associated function group determination unit 38 grasps a QoS class, based on a QoS class identifier (QCI) allocated to an own session. Then, the associated function group determination unit 38 sets the grasped QoS class as a group to which the own session belongs, and notifies to the transmission control function group 39 associated with the group.

Further, when the data transmission device 30 is a device other than a base station device or a P-GW, the associated function group determination unit 38 may grasp, from the base station device or the P-GW, a QoS class or the like, based on information notification received from a QCI or the like, and set the QoS class or the like, as a group to which the own session belongs.

Further, the associated function group determination unit 38 is also able to determine a group of each of own sessions as follows. The data transmission/reception unit 13 measures or calculates a value distribution or a statistical value of a transmission delay time, a variation width of a transmission delay time, an arrival interval of a data packet or an ACK packet, throughput, and the like for each of own sessions. Further, the data transmission/reception unit 13 measures or calculates the above-described value distribution or statistical value to be observed in an own session belonging to each of groups. Then, the associated function group determination unit 38 calculates a degree of approximation between the value measured or calculated in the own session, and the value measured or calculated in a communication session belonging to each of the groups by using a method such as a hypothesis test method or a Bayesian estimation method, and determines the belonging group, based on the degree of approximation.

By configuring the data transmission device 30 as described above, the data transmission device 30 estimates a congestion degree of at least a part of communication sessions in which a communication resource to be used in an own session is shared, based on communication quality measurable by the data transmission device 30 itself. Then, the data transmission device 30 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Figure 8:
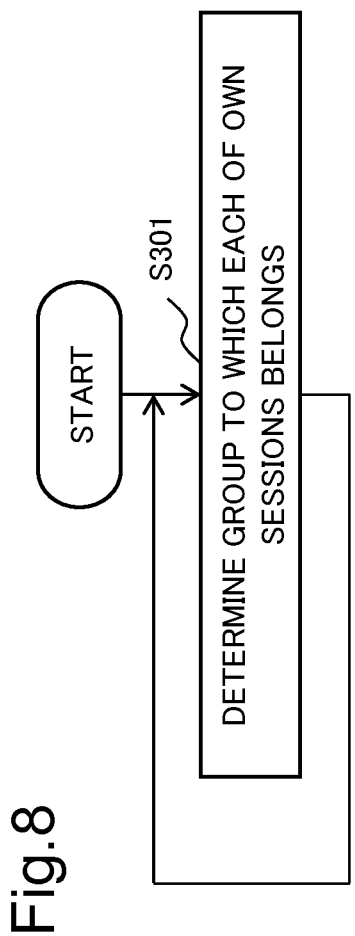
FIG. 8 shows an operation example of the data transmission device according to the third example embodiment of the present invention.

Next, an operation example of the data transmission device 30 is illustrated in FIG. 8. The operation example of FIG. 8 is an example of an operation to be performed by the data transmission device 30 in combination with the operation example (FIG. 6) in the second example embodiment.

The associated function group determination unit 38 determines to which group, each of own sessions belongs at a predetermined timing, and notifies to the transmission control function group 39 of the belonging group (Step S301). The predetermined timing is a point of time when a communication session (own session) is established between the data transmission device 30 and a data reception device 60, a point of time when the data transmission/reception unit 13 receives a data request message from the data reception device 60, a predetermined time interval, or the like.

Since an operation of each of the transmission control function groups 39 and an operation of the data transmission/reception unit 13 are similar to those in the second example embodiment, description thereof is omitted.

By proceeding as described above, the data transmission device 30 estimates a congestion degree of at least a part of communication sessions in which a communication resource to be used in an own session is shared, based on communication quality measurable by the data transmission device 30 itself. Then, the data transmission device 30 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

As described above, in the third example embodiment according to the present invention, the data transmission device 30 estimates a congestion degree of at least a part of communication sessions in which a communication resource to be used in an own session is shared, based on communication quality measurable by the data transmission device 30 itself. Then, the data transmission device 30 determines a transmission data amount of transmission data, based on the congestion degree of the communication session. Thus, it becomes possible to control a transmission data amount in an appropriate range also by considering a state of another session in which the communication resource is shared, without the need of a special configuration. Therefore, it becomes possible to control a transmission data amount in an appropriate range by an easier method, and achieve throughput improvement, shortening of delay, and suppression of packet retransmission in all communication resources.

Further, it becomes possible to apply the data transmission device 30 according to the present example embodiment to a larger number of systems.

[Hardware Configuration Example]

A configuration example of a hardware resource which implements, by use of one information processing device (computer), the data transmission device (10, 20, 30) in each example embodiment of the present invention described above is described. Note that the data transmission device may be physically or functionally implemented by use of at least two information processing devices. Moreover, the data transmission device may be implemented as a dedicated device. Further, only some functions of the data transmission device may be implemented by use of an information processing device.

Figure 9:
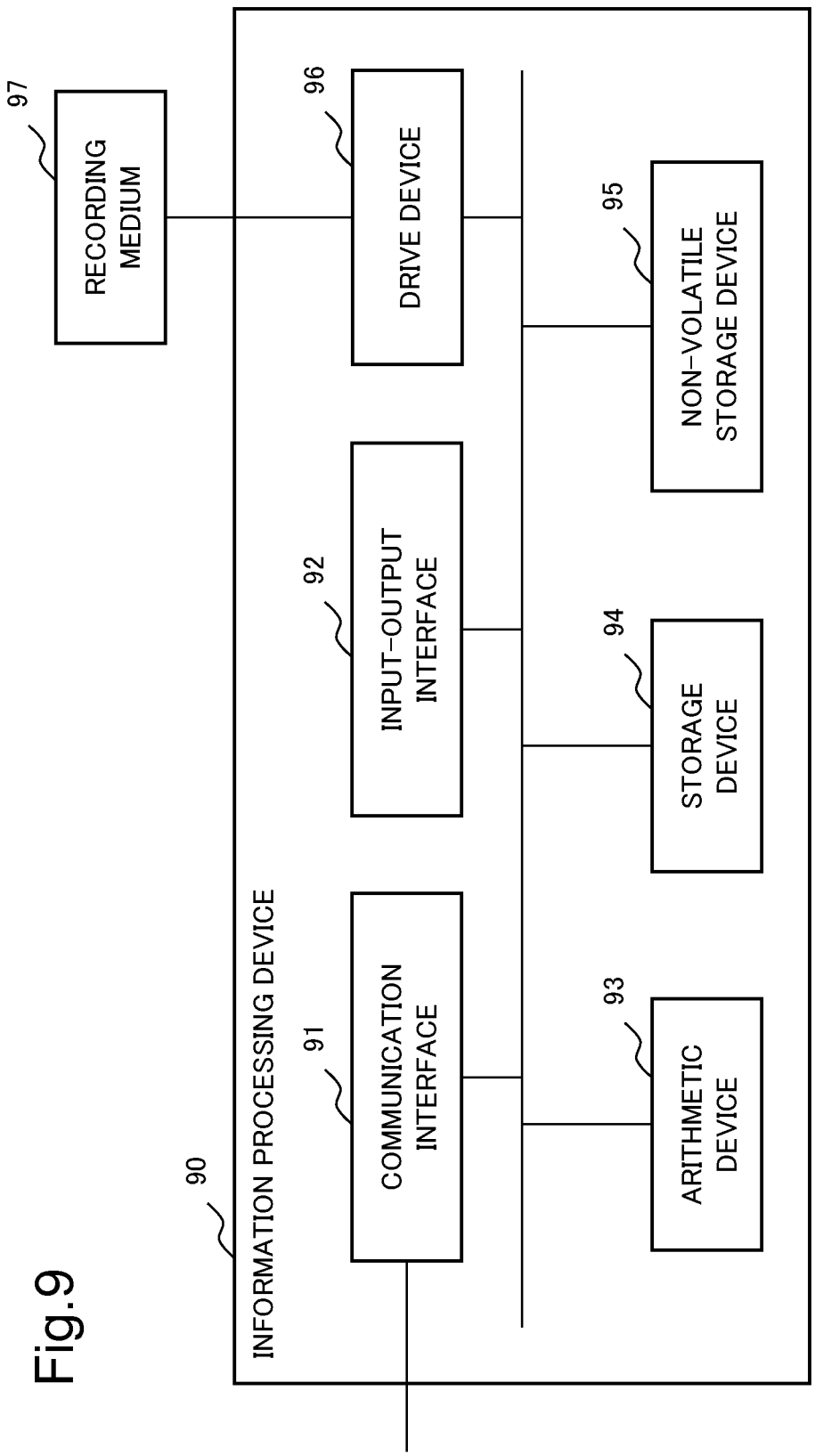
FIG. 9 shows a hardware configuration example according to each of the example embodiments of the present invention.

FIG. 9 is a diagram schematically showing a hardware configuration example of an information processing device being capable of implementing the data transmission device in each example embodiment of the present invention. An information processing device 90 includes a communication interface 91, an input/output interface 92, an arithmetic device 93, a storage device 94, a non-volatile storage device 95, and a drive device 96.

The communication interface 91 is a communication means with which the data transmission device in each example embodiment communicates with an external device in a wired or wireless way. Note that, when the data transmission device is implemented by use of at least two information processing devices, the devices may be connected to each other in such a way as to be able to mutually communicate via the communication interface 91.

The input/output interface 92 is a man machine interface such as a keyboard being one example of an input device, or a display as an output device.

The arithmetic device 93 is an arithmetic processing device such as a general-purpose central processing unit (CPU) or a microprocessor. The arithmetic device 93 can read, for example, various programs stored in the non-volatile storage device 95, into the storage device 94, and execute processing in accordance with the read program.

The storage device 94 is a memory device such as a random access memory (RAM) which can be referred to from the arithmetic device 93, and stores a program, various data, and the like. The storage device 94 may be a volatile memory device.

The non-volatile storage device 95 is a non-volatile storage device such as a read only memory (ROM), a flash memory, or the like, and can store various programs, data, and the like.

The non-volatile storage device 95 is a non-volatile storage device such as a read only memory (ROM), a flash memory, or the like, and can store various programs, data, and the like.

The recording medium 97 is any recording medium such as an optical disk, a magneto-optical disk, a semiconductor flash memory or the like being capable of recording data.

Each example embodiment of the present invention may be implemented by, for example, configuring a data transmission device by the information processing device 90 exemplified in FIG. 9, and supplying this data transmission device with a program being capable of implementing a function described in each of the example embodiments described above.

In this case, the arithmetic device 93 executes the program supplied to the data transmission device, and thereby, an example embodiment can be implemented. Moreover, not all but some of the functions of the data transmission device can be configured by the information processing device 90.

Furthermore, the present invention may be configured in such a way that the program described above is recorded in the recording medium 97, and appropriately stored in the non-volatile storage device 95 at a shipment stage, an operation stage, or the like of the data transmission device. Note that, in this case, a method of installing the program described above into the data transmission device by utilizing a suitable jig at a manufacturing stage before shipment, an operation stage, or the like may be adopted as a method of supplying the program described above. Moreover, a general procedure such as a method of externally downloading the program described above via a communication line such as the Internet may be adopted as a method of supplying the program described above.

The whole or part of the example embodiments disclosed above can be described as, but not limited to, the following supplementary notes.

(Supplementary Note 1)

A data transmission device comprising:

a data transmission/reception means for performing transmission of transmission data, based on a transmission data amount;

a congestion degree estimation means for estimating a congestion degree of at least a part of communication sessions in which a communication resource to be used in an own session to be used in the transmission of the transmission data is shared, based on communication quality being measurable by the data transmission device itself and relating to the transmission of the transmission data; and a transmission data amount determination means for determining the transmission data amount, based on the congestion degree of the communication session.

(Supplementary Note 2)

The data transmission device according to supplementary note 1, wherein the congestion degree estimation means estimates an estimated number of sessions of the communication session in which the communication resource is shared, and estimates the congestion degree of the communication session, based on the estimated number of sessions and the congestion degree of the own session.

(Supplementary Note 3)

The data transmission device according to supplementary note 1, wherein the congestion degree estimation means estimates the congestion degree of the communication session by estimating an available bandwidth of the communication session, based on a maximum value of throughput of the own session at a predetermined time interval, and calculating a product of the available bandwidth and a queuing delay.

(Supplementary Note 4)

The data transmission device according to supplementary note 1 or 3, further comprising a target congestion degree determination means for determining a target congestion degree being a target value of the congestion degree, wherein the transmission data amount determination means determines the transmission data amount, based on the congestion degree and the target congestion degree.

(Supplementary Note 5)

The data transmission device according to supplementary note 4, wherein the target congestion degree determination means modifies the target congestion degree in such a way that, as an estimated number of sessions of the communication session in which the communication resource is shared increases, the target congestion degree decreases.

(Supplementary Note 6)

The data transmission device according to supplementary note 2, further comprising a target congestion degree determination means for determining a target congestion degree being a target value of the congestion degree, wherein the transmission data amount determination means determines the transmission data amount, based on the congestion degree and the target congestion degree.

(Supplementary Note 7)

The data transmission device according to supplementary note 6, wherein the target congestion degree determination means modifies the target congestion degree in such a way that, as the estimated number of sessions increases, the target congestion degree decreases.

(Supplementary Note 8)

The data transmission device according to any one of supplementary notes 2, and 5 to 7, wherein the estimated number of sessions is either one of a value acquired by dividing the congestion degree of the communication session by the congestion degree of the own session, a value estimated based on a maximum value and an average value of throughput of the own session at a predetermined time interval, a value acquired by measuring in advance a distribution or a statistical value of the communication quality being measurable in the own session, measuring the distribution or the statistical value during communication, and being estimated, based on a degree of approximation between the distribution or the statistical value measured in advance, and the distribution or the statistical value during communication, and, when it is assumed that a predetermined value is the congestion degree of the communication session when an ACK packet appended with a congestion detection flag is received, a value estimated based on the congestion degree of the own session and the congestion degree of the communication session at the point of time.

(Supplementary Note 9)

The data transmission device according to any one of supplementary notes 1 to 8, further comprising:

one or more transmission control function groups including the congestion degree estimation means and the transmission data amount determination means; and an associated function group determination means for determining which group of the communication session in which the communication resource is shared, the own session belongs to, wherein each of the transmission data amount determination means determines the transmission data amount of the own session of the group associated with an own means.

(Supplementary Note 10)

The data transmission device according to any one of supplementary notes 1 to 9, wherein the congestion degree is an index relating to one or more of an amount of retention data retaining in network equipment constituting the communication resource, an amount of data being in flight, an increment in the amount of retention data or the amount of data being in flight within a past predetermined period, a decrement in frequency of arrival of an ACK packet, a decrement in the communication resource estimated from an amount of data of which reception is acknowledged by the ACK packet, and an arrival interval of the ACK packet, a frequency of occurrence of data packet loss, and an increment in RTT.

(Supplementary note 11)

A data transmission method comprising:

estimating a congestion degree of at least a part of communication sessions in which a communication resource to be used in an own session to be used in transmission of transmission data is shared, based on communication quality being measurable by a data transmission device and relating to the transmission of the transmission data, the data transmission device performing the transmission of the transmission data;

determining a transmission data amount, based on the congestion degree of the communication session; and performing the transmission of the transmission data, based on the transmission data amount.

(Supplementary Note 12)

The data transmission method according to supplementary note 11, further comprising estimating an estimated number of sessions of the communication session in which the communication resource is shared, and estimating the congestion degree of the communication session, based on the estimated number of sessions and the congestion degree of the own session.

(Supplementary Note 13)

The data transmission method according to supplementary note 11, further comprising estimating the congestion degree of the communication session by estimating an available bandwidth of the communication session, based on a maximum value of throughput of the own session at a predetermined time interval, and calculating a product of the available bandwidth and a queuing delay.

(Supplementary Note 14)

The data transmission method according to supplementary note 11 or 13, further comprising:

determining a target congestion degree being a target value of the congestion degree; and determining the transmission data amount, based on the congestion degree and the target congestion degree.

(Supplementary Note 15)

The data transmission method according to supplementary note 14, further comprising modifying the target congestion degree in such a way that, as an estimated number of sessions of the communication session in which the communication resource is shared increases, the target congestion degree decreases.

(Supplementary Note 16)

The data transmission method according to supplementary note 12, further comprising:

determining a target congestion degree being a target value of the congestion degree; and determining the transmission data amount, based on the congestion degree and the target congestion degree.

(Supplementary Note 17)

The data transmission method according to supplementary note 16, further comprising modifying the target congestion degree in such a way that, as the estimated number of sessions increases, the target congestion degree decreases.

(Supplementary Note 18)

The data transmission method according to any one of supplementary notes 12, and 15 to 17, wherein the estimated number of sessions is either one of a value acquired by dividing the congestion degree of the communication session by the congestion degree of the own session, a value estimated based on a maximum value and an average value of throughput of the own session at a predetermined time interval, a value acquired by measuring in advance a distribution or a statistical value of the communication quality being measurable in the own session, measuring the distribution or the statistical value during communication, and being estimated, based on a degree of approximation between the distribution or the statistical value measured in advance, and the distribution or the statistical value during communication, and, when it is assumed that a predetermined value is the congestion degree of the communication session when an ACK packet appended with a congestion detection flag is received, a value estimated based on the congestion degree of the own session and the congestion degree of the communication session at the point of time.

(Supplementary Note 19)

The data transmission method according to any one of supplementary notes 11 to 18, further comprising:

determining which group of the communication session in which the communication resource is shared, the own session belongs to; and determining the transmission data amount of the own session belonging to the group for each of the groups.

(Supplementary Note 20)

The data transmission method according to any one of supplementary notes 11 to 19, wherein the congestion degree is an index relating to one or more of an amount of retention data retaining in network equipment constituting the communication resource, an amount of data being in flight, an increment in the amount of retention data or the amount of data being in flight within a past predetermined period, a decrement in frequency of arrival of an ACK packet, a decrement in the communication resource estimated from an amount of data of which reception is acknowledged by the ACK packet, and an arrival interval of the ACK packet, a frequency of occurrence of data packet loss, and an increment in RTT.

(Supplementary Note 21)

A data transmission program causing a computer to execute:

a data transmission/reception function of performing transmission of transmission data, based on a transmission data amount;

a congestion degree estimation function of estimating a congestion degree of at least a part of communication sessions in which a communication resource to be used in an own session to be used in the transmission of the transmission data is shared, based on communication quality being measurable by a data transmission device and relating to the transmission of the transmission data, the data transmission device performing the transmission of the transmission data; and a transmission data amount determination function of determining the transmission data amount, based on the congestion degree of the communication session.

(Supplementary Note 22)

The data transmission program according to supplementary note 21, wherein the congestion degree estimation function estimates an estimated number of sessions of the communication session in which the communication resource is shared, and estimates the congestion degree of the communication session, based on the estimated number of sessions and the congestion degree of the own session.

(Supplementary Note 23)

The data transmission program according to supplementary note 21, wherein the congestion degree estimation function estimates the congestion degree of the communication session by estimating an available bandwidth of the communication session, based on a maximum value of throughput of the own session at a predetermined time interval, and calculating a product of the available bandwidth and a queuing delay.

(Supplementary Note 24)

The data transmission program according to supplementary note 21 or 23 further causing a computer to execute a target congestion degree determination function of determining a target congestion degree being a target value of the congestion degree, wherein the transmission data amount determination function determines the transmission data amount, based on the congestion degree and the target congestion degree.

(Supplementary Note 25)

The data transmission program according to supplementary note 24, wherein the target congestion degree determination function modifies the target congestion degree in such a way that, as an estimated number of sessions of the communication session in which the communication resource is shared increases, the target congestion degree decreases.

(Supplementary Note 26)

The data transmission program according to supplementary note 22 further causing a computer to execute a target congestion degree determination function of determining a target congestion degree being a target value of the congestion degree, wherein the transmission data amount determination function determines the transmission data amount, based on the congestion degree and the target congestion degree.

(Supplementary Note 27)

The data transmission program according to supplementary note 26, wherein the target congestion degree determination function modifies the target congestion degree in such a way that, as the estimated number of sessions increases, the target congestion degree decreases.

(Supplementary Note 28)

The data transmission program according to any one of supplementary notes 22, and 25 to 27, wherein the estimated number of sessions is either one of a value acquired by dividing the congestion degree of the communication session by the congestion degree of the own session, a value estimated based on a maximum value and an average value of throughput of the own session at a predetermined time interval, a value acquired by measuring in advance a distribution or a statistical value of the communication quality being measurable in the own session, measuring the distribution or the statistical value during communication, and being estimated, based on a degree of approximation between the distribution or the statistical value measured in advance, and the distribution or the statistical value during communication, and, when it is assumed that a predetermined value is the congestion degree of the communication session when an ACK packet appended with a congestion detection flag is received, a value estimated based on the congestion degree of the own session and the congestion degree of the communication session at the point of time.

(Supplementary Note 29)

The data transmission program according to any one of supplementary notes 21 to 28 further causing a computer to execute:

one or more transmission control function groups including the congestion degree estimation function and the transmission data amount determination function; and an associated function group determination function of determining which group of the communication session in which the communication resource is shared, the own session belongs to, wherein each of the transmission data amount determination functions determines the transmission data amount of the own session of the group associated with an own function.

(Supplementary Note 30)

The data transmission program according to any one of supplementary notes 21 to 29, wherein the congestion degree is an index relating to one or more of an amount of retention data retaining in network equipment constituting the communication resource, an amount of data being in flight, an increment in the amount of retention data or the amount of data being in flight within a past predetermined period, a decrement in frequency of arrival of an ACK packet, a decrement in the communication resource estimated from an amount of data of which reception is acknowledged by the ACK packet, and an arrival interval of the ACK packet, a frequency of occurrence of data packet loss, and an increment in RTT.

(Supplementary Note 31)

A computer readable recording medium recorded with the data transmission program according to any one of supplementary notes 21 to 30.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-124336, filed on Jun. 26, 2017, the disclosure of which is incorporated herein in its entirety by reference.

REFERENCE SIGNS LIST 10, 20, 30 Data transmission device
11 Congestion degree estimation unit
12 Transmission data amount determination unit
13 Data transmission/reception unit
24 Own session congestion degree estimation unit
25 All sessions congestion degree estimation unit
26 Target congestion degree determination unit
38 Associated function group determination unit
39 Transmission control function group
60 Data reception device
80 Network
90 Information processing device
91 Communication interface
92 Input-output interface
93 Arithmetic device
94 Storage device
95 Non-volatile storage device
96 Drive device
97 Recording medium

The invention claimed is:

1. A data transmission device comprising one or more memories storing instructions and one or more processors configured to execute the instructions to:
perform transmission of transmission data, based on a transmission data amount;
estimate a congestion degree of at least a part of communication sessions in which a communication resource to be used in an own session to be used in the transmission of the transmission data is shared, based on communication quality being measurable by the data transmission device itself and relating to the transmission of the transmission data; and
determine the transmission data amount, based on the congestion degree of the communication session, wherein
the one or more processors are configured to execute the instructions to estimate an estimated number of sessions of the communication session in which the communication resource is shared, and estimate the congestion degree of the communication session, based on the estimated number of sessions and the congestion degree of the own session.

2. The data transmission device according to claim 1, wherein
the one or more processors are configured to execute the instructions to:
determine a target congestion degree being a target value of the congestion degree, and
determine the transmission data amount, based on the congestion degree and the target congestion degree.

3. The data transmission device according to claim 2, wherein
the one or more processors are configured to execute the instructions to modify the target congestion degree in such a way that, as the estimated number of sessions increases, the target congestion degree decreases.

4. The data transmission device according to claim 1, wherein
the estimated number of sessions is either one of a value acquired by dividing the congestion degree of the communication session by the congestion degree of the own session, a value estimated based on a maximum value and an average value of throughput of the own session at a predetermined time interval, a value acquired by measuring in advance a distribution or a statistical value of the communication quality being measurable in the own session, measuring the distribution or the statistical value during communication, and being estimated, based on a degree of approximation between the distribution or the statistical value measured in advance, and the distribution or the statistical value during communication, and, when it is assumed that a predetermined value is the congestion degree of the communication session when an ACK packet appended with a congestion detection flag is received, a value estimated based on the congestion degree of the own session and the congestion degree of the communication session at the point of time.

5. A data transmission method comprising:
estimating a congestion degree of at least a part of communication sessions in which a communication resource to be used in an own session to be used in transmission of transmission data is shared, based on communication quality being measurable by a data transmission device and relating to the transmission of the transmission data, the data transmission device performing the transmission of the transmission data;
determining a transmission data amount, based on the congestion degree of the communication session;
performing the transmission of the transmission data, based on the transmission data amount; and
estimating an estimated number of sessions of the communication session in which the communication resource is shared, and estimating the congestion degree of the communication session, based on the estimated number of sessions and the congestion degree of the own session.

6. A non-transitory computer readable recording medium recorded with a data transmission program causing a computer to execute:
a data transmission/reception function of performing transmission of transmission data, based on a transmission data amount;
a congestion degree estimation function of estimating a congestion degree of at least a part of communication sessions in which a communication resource to be used in an own session to be used in the transmission of the transmission data is shared, based on communication quality being measurable by a data transmission device and relating to the transmission of the transmission data, the data transmission device performing the transmission of the transmission data; and
a transmission data amount determination function of determining the transmission data amount, based on the congestion degree of the communication session, wherein
the congestion degree estimation function estimates an estimated number of sessions of the communication session in which the communication resource is shared, and estimates the congestion degree of the communication session, based on the estimated number of sessions and the congestion degree of the own session.

* * * * *